Dec. 1, 1964    H. E. KYLE ETAL    3,159,679
OXO RECOVERY PROCESS
Filed Dec. 28, 1960
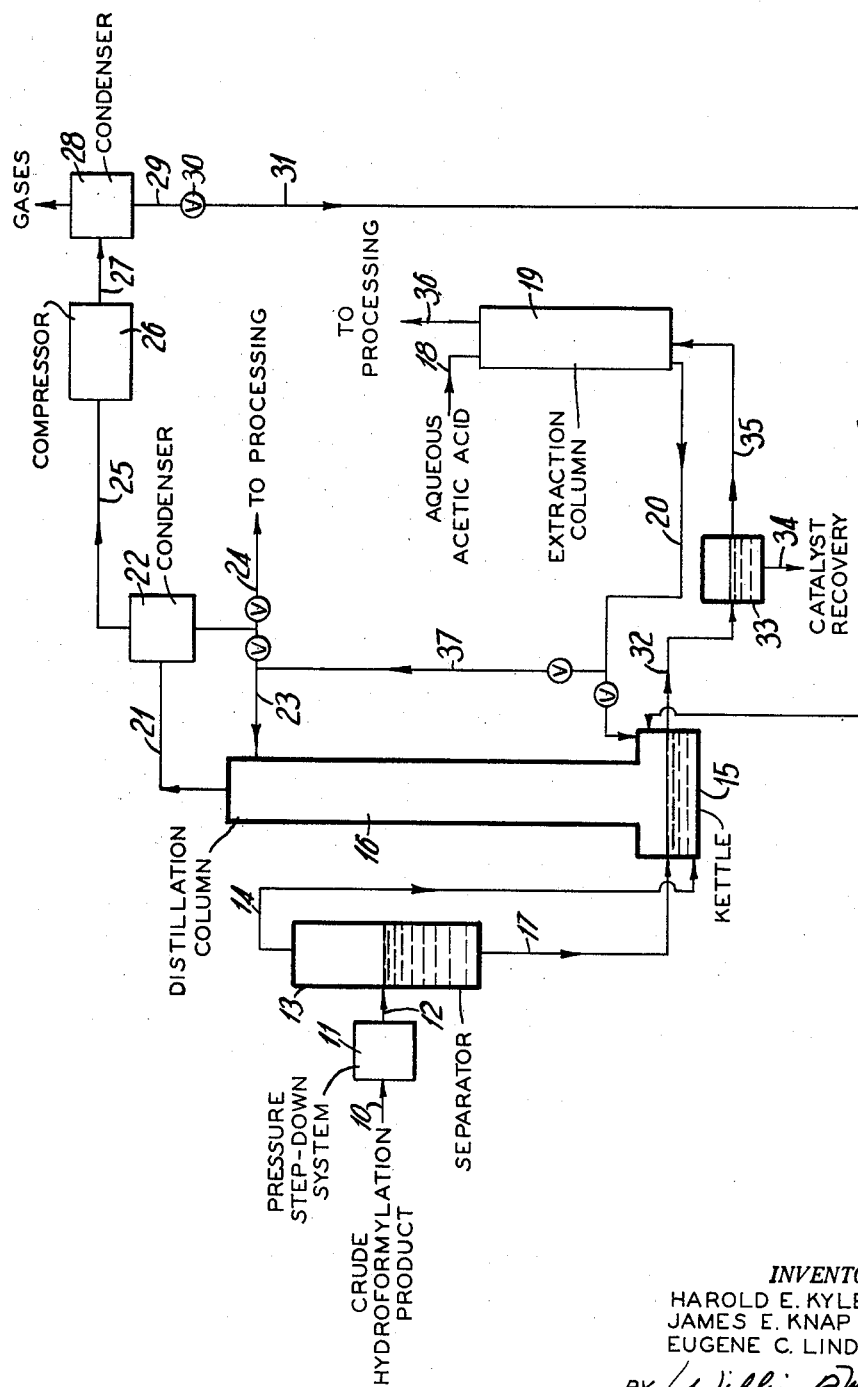
INVENTORS
HAROLD E. KYLE
JAMES E. KNAP
EUGENE C. LINDBLAD
BY William R. Moran
ATTORNEY 3,159,679
OXO RECOVERY PROCESS
Harold E. Kyle, St. Albans, and James E. Knap and Eugene C. Lindblad, Charleston, W. Va., assignors to Union Carbide Corporation, a corporation of New York
Filed Dec. 28, 1960, Ser. No. 78,968
7 Claims. (Cl. 260—604)

This invention relates to an improved process for the preparation of oxygen-containing organic compounds by the reaction of an olefinically unsaturated organic compound with hydrogen and carbon monoxide in the presence of a hydroformylation catalyst. In one aspect, this invention relates to an improved process for the production of aldehydes and alcohols by the reaction of an olefinic compound containing at least one carbon to carbon double bond with hydrogen and carbon monoxide in the presence of cobalt-containing hydroformylation catalysts.

According to the accepted prior art procedures, it has been customary to react an olefin, carbon monoxide and hydrogen together in a first stage in the presence of a cobalt-containing catalyst to produce a crude hydroformylation product consisting of a liquid phase and a gaseous phase. The resulting crude liquid phase comprises aldehydes and alcohols containing one more carbon atom than the starting olefin, as well as a variety of by-products, such as those formed from condensation, aldolization, acetalization and esterification of the products. Additionally, the gaseous phase comprises unreacted starting materials and volatile cobalt catalyst. In a second step, gaseous and liquid products are separated and the latter, comprising largely aldehydes, alcohols and dissolved metal catalyst, is treated in a catalyst removal zone for removal of the soluble metal compounds. The off-gases which also contain volatile cobalt compounds are then either vented to the atmosphere, burned as fuel, or recycled to the first stage of the process. Finally, in the third step, the catalyst-free liquid product is hydrogenated to the corresponding alcohol or oxidized to the corresponding carboxylic acid. Inasmuch as the hydrogenation catalyst can be readily poisoned by the presence of small amounts of cobalt, the second stage, the catalyst removal stage, has become increasingly more important.

Although the prior art teaches numerous methods for the removal and recovery of the cobalt catalyst from the crude liquid hydroformylation product, it is largely silent on the removal of the volatile cobalt compounds from the off-gas stream. This is indeed surprising inasmuch as the volatile cobalt carbonyl is known to decompose to cobalt metal on metallic surfaces. This deposit of metallic cobalt, particularly on heating surfaces, necessitates constant removal to prevent plugging and fouling of lines and compressors particularly where the off-gases are to be recycled to the first stage or utilized in other syntheses where the presence of cobalt is undesirable. Removal of the deposited cobalt metal is a tedious and difficult process which adds significantly to the overall cost of the hydroformylation process.

Accordingly, one or more of the following objects will be achieved by the practice of the instant invention. It is an object of the present invention to provide an improved process for the production of aldehydes and alcohols. Another object of the present invention is to provide an improved process for the production of aldehydes and alcohols wherein the off-gases and liquid products from the hydroformylation reaction are decobalted simultaneously. It is also an object of the present invention to provide an improved process for the recovery of substantially all the cobalt employed. A further object is to provide an improved process for recovery of substantially all the cobalt in a form suitable for reuse in the hydroformylation process. Another object is to provide an improved process for the production of an aldehyde fraction of high quality and which results in an increase in catalyst life during hydrogenation. A further object of the present invention is to provide an improved process whereby serious problems, such as plugging and fouling of the product-treating equipment, are substantially avoided. These and other objects will readily become apparent to those skilled in the art in the light of the teachings herein set forth.

In accordance with the process of the present invention it has been found that volatile cobalt compounds can be efficiently and simultaneously removed from both the off-gases and the crude liquid product by separating the reaction product at atmospheric pressure into a gaseous and liquid product; passing the liquid product into a decobalting zone which is maintained at a temperature sufficient to cause the aldehydes and alcohols to steam distill; forming a mixture in the decobalting zone of a solution of a lower organic acid and the liquid product; simultaneously sparging the gaseous product into the mixture whereby vigorous agitation of the mixture is obtained; and thereafter removing overhead a gaseous and liquid product substantially free of cobalt. By the aforesaid process, not only is the cobalt removal effected simultaneously from both the off-gases and the aldehyde-alcohol mixture, but the removal is conducted in a more efficient manner than heretofore known.

It is thus possible by the process of the instant invention to simultaneously reduce the cobalt content of the liquid product from as much as 1 percent by weight, and higher, to less than 5 parts per million, and the gaseous product from 200 parts per million, and higher, to less than 4 parts per million. By operating in this manner, essentially all the cobalt utilized in the process is recovered in a form suitable for reuse. Moreover, from an economic viewpoint substantial savings can be effected in recovering essentially all the cobalt employed in one decobalting operation. It should be further noted that the instant process is unique in that a more efficient decobalting of the liquid product is obtained through vigorous agitation of the product.

The present invention will best be understood from the more detailed description presented hereinafter, where reference will be made to the accompanying drawing.

With reference to the drawing, the schematic diagram illustrates a preferred embodiment of the process of the instant invention. The crude hydroformylation product obtained from the reaction of an olefin, carbon monoxide and hydrogen in the presence of a cobalt-containing hydroformylation catalyst is passed from the reactor under full-system pressure, i.e., 2000 to 10,000 pounds per square inch gauge, by way of line 10 to a pressure step-down system 11. At this stage the crude hydroformylation product comprises liquid product containing about 1.0 weight percent cobalt and unreacted synthesis gas containing about 200 parts per million of cobalt. Thereafter the crude product is passed by way of line 12 to separator 13 wherein separation into a liquid and gaseous phase occurs. The gases are removed overhead by way of line 14 and passed to the kettle 15 of the distillation column 16. Liquid product is withdrawn from separator 13 and passed by way of line 17 to kettle 15. Introduction of the gases to the kettle is effected by the use of a conventional sparger beneath the liquid surface whereby violent agitation of the kettle contents is achieved. The sparger should be sufficiently perforated to minimize the pressure drop. Aqueous acetic acid of from about 1 to about 10 weight percent, and preferably from about 0.5 to about 5 weight percent is introduced by way of line 18 to extraction column 19 and passed by way of line 20 to kettle 15 or by way of line 37 to the top of column 16. The temperature level within the kettle 15 is maintained so that the aldehydes in the crude hydroformylation product steam distill. Thus, the aldehydes present in the crude product essentially flash distill upon reaching the kettle, thereby preventing decomposition and undesirable side reactions, such as aldol condensation, polymerization and the like. Vaporous aldehyde gas, and some water rise up the distillation column 16 which contains about 20 trays. The reflux ratio in column 16 is maintained at one to one, or higher. Thereafter the vapors from the distillation column pass by way of line 21 to condenser 22 where the liquid and gases are separated. A portion of the liquid product is returned to the distillation column by way of line 23, and the remainder is passed as wet aldehyde by way of line 24 to be processed or refined as desired. The liquid products contain less than 4 parts per million of cobalt. Gaseous product from condenser 22 is passed by way of line 25 to compressor 26 where it is compressed from approximately atmospheric pressure to 600 pounds per square inch gauge. Subsequently, the gases are passed from the compressor 26 by way of line 27 to condenser 28 where the aldehydes, hydrocarbons, and the like are separated, as liquids, from unreacted carbon monoxide and hydrogen. The gases from condenser 28 at 600 pounds per square inch gauge contain from nil to 5.6 parts per million of cobalt.

Liquified products are then withdrawn from condenser 28 by way of line 29 to throttle 30 where the pressure is reduced to atmospheric pressure. Thereafter, the products are reintroduced to kettle 15 by way of line 31 for recontact with the acetic acid solution.

An aqueous solution of cobalt acetate and an organic layer which comprises "heavy ends" from the hydroformylation are removed from kettle 15 by way of line 32 to settling tank 33 wherein a liquid organic and water layer separate. The water layer, which contains dissolved cobalt acetate and excess acetic acid, is removed by way of line 34 and the cobalt recovered in any desired manner. The organic layer is passed by way of line 35 to the base of extraction column 19. As the organic material rises through the column, it is washed in a countercurrent manner by the descending acetic acid solution whereby removal of any remaining cobalt is effected. The liquid organic material is passed by way of line 36 to be processed as desired.

Having thus described the process of this invention as illustrated in the accompanying drawing a discussion of the several factors pertinent to the operation of the process will aid in a fuller understanding of the invention.

Introduction of the off-gases containing volatile cobalt carbonyl to the decobalting zone is effected so that violent agitation of the kettle contents is achieved. This is best accomplished by admitting the gases below the liquid level by the use of a sparger. Any conventional sparger can be employed which is sufficiently perforated to minimize the pressure drop at the sparger head and liquid juncture. Suitable spargers include, among others, perforated-pipe sparger, perforated-plate spargers and the like.

Suitable organic acids which can be employed in the decobalting step of the instant invention include among others, acetic, formic, propionic, oxalic and the like. Acetic acid is preferred inasmuch as its cobalt salts have greater water solubility and thereby need less water for their complete recovery. Acetic acid is added to the decobalting zone as an aqueous solution having a concentration of acid in water of from about 0.5 to about 10 percent by weight and more preferably from about 0.5 to about 5 percent by weight. The acid is added in an amount sufficient to combine with all the cobalt present in both the gaseous and liquid phase. In practice, it has been found that the ratio of liquid hydroformylation product to acetic acid solution should be from about 8:1 to about 1:1 on a volume basis when a 2 percent acetic acid solution is utilized. Sufficient water is employed to dissolve all the cobalt salt formed and the required quantity will, of course, vary depending upon the particular cobalt salt formed.

Temperatures within the decobalting zone are maintained within a range sufficient to cause the aldehyde-alcohol mixture to steam distill. In general temperatures of from about 60° to about 110° C. have been found satisfactory although temperatures above and below the aforesaid range can also be employed.

Contact time of the liquid products in the decobalting zone with the aqueous acid solution will vary somewhat depending upon the particular conditions employed. In general, a contact time of from about 0.25 to about 2.0 hours is usually sufficient. Longer contact times are operable but not preferred because of possible degradation of the products. The aldehydes present in the crude products essentially flash distill upon reaching the kettle in the decobalting zone while the other components, such as the alcohols, remain about one hour.

Pressure is not necessarily critical in the decobalting zone and those within the range of from atmospheric to 100 pounds per square inch gauge are operable.

The process of the present invention is applicable regardless of the nature or manner in which the cobalt catalyst is employed. The catalyst can be employed in either (a) the insoluble form such as cobalt metal, cobalt oxide, cobalt carbonate, or as cobalt salts, such as cobalt acetate, which are introduced in slurry form; or (b) as the soluble cobalt compounds such as cobalt carbonyl or hydrocarbonyl, cobalt naphthenate, stearate, or 2-ethylhexanoate and the like, introduced in a solution of a hydrocarbon or oxygen-containing organic solvent such as alcohols, esters, ethers and the like; or (c) aqueous solution of cobalt salts, such as cobalt formate, cobalt acetate, and the like.

However, the optimum results are obtained when the catalyst is employed in the form of an oil insoluble cobalt salt of a lower aliphatic monocarboxylic acid such as cobalt acetate, formate or propionate dissolved or slurried in a lower aliphatic alcohol such as methanol, ethanol, propanol and butanol. The utilization of a water-soluble-oil-insoluble cobalt salt of a lower aliphatic carboxylic acid represents a cheaper and more readily available form for the source of the active catalyst.

The olefins suitable for use as starting materials in the process of the present invention can be any long or short-chained olefinic compounds, including not only hydrocarbon, but most other organic compounds having a carbon to carbon olefinic linkage, such as, for example, unsaturated alcohols, acids, ester and the like. Straight and branched-chain olefins and diolefins containing from 2 to 15 carbon atoms, such as ethylene, propylene, butenes, pentenes, pentadienes, hexenes, heptenes, styrenes, olefin polymers, including diisobutylene, triisobutylene, hexene dimers, heptene dimers, polypropylenes such as, tripropylene, and tetrapropylene, and olefinic fractions from the hydrocarbon synthesis process, thermal or catalytic cracking operations and other sources of hydrocarbon fractions containing such olefins, can be employed as starting materials depending on the nature of the desired final product.

While the synthesis gas mixture fed to the first stage may be any desired ratio of hydrogen to carbon monoxide, it is preferred to employ a ratio within the limits of 1.0 to 2.0 volumes of hydrogen per volume of carbon monoxide. The ratio of carbon monoxide to olefin should be at least 1:1 or higher on a molar basis, preferably about 1.5:1.0. While the actual conditions for reacting olefins with the synthesis gases will undoubtedly vary in accordance with the nature of the olefin feed, it is preferred to conduct the reaction at a temperature within the range of from about 100° C. to about 250° C. under superatmospheric pressures in the range of from about 2000 to 10,000 pounds per square inch absolute.

The hydroformylation reaction is generally carried out in conventional pressure vessel, such as tanks, towers, autoclaves, or tubular reactors, particularly designed to maintain necessary pressures and temperatures of the reaction. In the hydroformylation reaction of higher molecule weight olefins such as the octenes, nonenes, dodecenes, and like compounds, the chemical reaction rate is quite slow and, in many instances, is the controlling factor of the process. In such case the reaction rate will determine, in part, the design of equipment and the manner of operation of the process.

The following example is illustrative:

*Example 1*

A sample of propylene was reacted with carbon monoxide and hydrogen at a pressure of 6000 pounds per square inch absolute and at a temperature of 165° C., in the presence of 3.9 percent by weight of cobalt acetate based on the olefin. The crude hydroformylation product, which upon analysis contain 0.6 percent by weight of cobalt, was thereafter continuously metered to the kettle of a laboratory distillation column equipped with 15 trays (approximately 10 theoretical trays at normal distillation conditions). Simultaneously, a measured amount of an aqueous solution containing 0.5 percent by weight of acetic acid, was fed continuously to the kettle. The total volumetric feed to the kettle was 400 cubic centimeters per hour in a ratio of three parts of the crude hydroformylation product to one part of the aqueous acetic acid solution. A gas stream, obtained from depressuring of the crude hydroformylation product, was introduced into the aqueous layer in the kettle through a sparger at the rate of three cubic feet per hour. Prior to entering the kettle, analysis of the gas showed the presence of 256 parts per million by volume of cobalt. By maintaining the temperature at the head of the column in the range 60–63° C., the water azeotropes of normal butyraldehyde and isobutyraldehyde were continuously withdrawn overhead. Undistilled organic compounds and a cobalt-enriched aqueous solution were removed continuously from the kettle of the column. The liquid reflux ratio was maintained at 5:1.

Analysis of the exit streams indicated that the recovered aldehyde contained only 4 parts per million cobalt and the gas stream only 3.4 parts per million cobalt. Thus 97.4 percent of the cobalt contained in the cobalt-rich inlet gas and 97.0 percent of the cobalt contained in the crude hydroformylation product were recovered as an aqueous solution.

Although the invention has been illustrated by the preceding example, it is not to be construed as limited to the materials employed herein, but rather, the invention encompasses the generic area as hereinbefore disclosed. Various modifications and embodiments of this invention can be made without departing from the spirit and scope thereof.

What is claimed is:

1. In a hydroformylation process wherein olefinic hydrocarbons containing from 2 to 15 carbon atoms and at least one double bond per molecule are contacted in an initial reaction zone with carbon monoxide and hydrogen in the presence of a cobalt hydroformylation catalyst under hydroformylation conditions to produce a crude hydroformylation product comprising aldehydes and alcohols containing one more carbon atom than the starting olefin, which is subsequently decobalted and distilled, the improvement in said process of: separating said crude product into a gaseous and liquid product; passing said liquid product into a decobalting zone, said zone being maintained at a temperature to cause said aldehydes and alcohols to steam distill; forming a mixture in said decobalting zone of a solution of a lower organic acid which is a member selected from the group consisting of formic, acetic, propionic, and oxalic acids, and said liquid product, said acid being added in an amount sufficient to combine with all the cobalt present in both the gaseous and liquid phase; simultaneously sparging said gaseous product into said mixture whereby vigorous agitation of said mixture is obtained; and removing overhead a gaseous and liquid product substantially free of cobalt.

2. In a hydroformylation process wherein olefinic hydrocarbons containing from 2 to 15 carbon atoms and at least one double bond per molecule are contacted in an initial reaction zone with carbon monoxide and hydrogen in the presence of a cobalt hydroformylation catalyst under hydroformylation conditions to produce a crude hydroformylation product comprising aldehydes and alcohols containing one more carbon atom than the starting olefin, which is subsequently decobalted and distilled, the improvement in said process of: separating said crude product into a gaseous and liquid product; passing said liquid product into a decobalting zone, said zone being maintained at a temperature to cause said aldehydes and alcohols to steam distill; forming a mixture in said decobalting zone of an aqueous acetic acid solution having a concentration of from about 1 to about 10 percent by weight, and said liquid product, said acid being added in an amount sufficient to combine with all the cobalt present in both the gaseous and liquid phase; simultaneously sparging said gaseous product into said mixture whereby vigorous agitation of said mixture is obtained; and removing overhead a gaseous and liquid product substantially free of cobalt.

3. In a hydroformylation process wherein olefinic hydrocarbons containing from 2 to 15 carbon atoms and at least one double bond per molecule are contacted in an initial reaction zone with carbon monoxide and hydrogen in the presence of a cobalt hydroformylation catalyst under hydroformylation conditions to produce a crude hydroformylation product comprising aldehydes and alcohols containing one more carbon atom than the starting olefin, which is subsequently decobalted and distilled, the improvement in said process of: separating said crude product into a gaseous and liquid product; passing said liquid product into a decobalting zone, said zone being maintained at a temperature to cause said aldehydes and alcohols to steam distill; forming a mixture in said decobalting zone of an aqueous acetic acid solution, having a concentration of from about 1 to about 10 percent by weight, and said liquid product in a volume ratio of liquid product to acetic acid solution of from about 8:1 to about 1:1, said acetic acid being added in an amount sufficient to combine with all the cobalt present in both the gaseous and liquid phase; simultaneously sparging said gaseous product into said mixture whereby vigorous agitation of said mixture is obtained; and removing overhead a gaseous and liquid product substantially free of cobalt.

4. In a hydroformylation process wherein olefinic hydrocarbons containing from 2 to 15 carbon atoms and at least one double bond per molecule are contacted in an initial reaction zone with carbon monoxide and hydrogen in the presence of a cobalt hydroformylation catalyst under hydroformylation conditions to product a crude hydroformylation product comprising aldehydes and alcohols containing one more carbon atom than the starting olefin, which is subsequently decobalted and distilled, the improvement in said process of: separating said crude product into a gaseous and liquid product; passing said liquid product into a decobalting zone, said zone being maintained at a temperature of from about 60° to about 110° C., forming a mixture in said decobalting zone of an aqueous acetic acid solution having a concentration of from about 1 to about 10 percent by weight and said liquid product, in a volume ratio of liquid product to acetic acid solution of from about 8:1 to about 1:1, said acetic acid being added in an amount sufficient to combine with all the cobalt present in both the gaseous and liquid phase; simultaneously sparging said gaseous product into said mixture at a rate sufficient to cause vigorous agitation of said liquid product and acid solution; and removing overhead a gaseous and liquid product substantially free of cobalt.

5. The process of claim 4 wherein said cobalt containing hydroformylation catalyst is cobalt acetate.

6. In a hydroformylation process wherein ethylene is contacted in an initial reaction zone with carbon monoxide and hydrogen in the presence of a cobalt hydroformylation catalyst under hydroformylation conditions to produce a crude hydroformylation product comprising propionaldehyde and propanol, which is subsequently decobalted and distilled, the improvement in said process of: separating said crude product into a gaseous and liquid product; passing said liquid product into a decobalting zone, said zone being maintained at a temperature of from about 60° to about 110° C., forming a mixture of an aqueous acetic acid solution having a concentration of from about 1 to about 10 percent by weight and said liquid product, in a volume ratio of liquid product to acetic acid solution of from about 8:1 to about 1:1, said acetic acid being added in an amount sufficient to combine with all the cobalt present in both the gaseous and liquid phase; simultaneously sparging said gaseous product into said mixture at a rate sufficient to cause vigorous agitation of said liquid product and acid solution of said liquid product and acid solution; and removing overhead a gaseous and liquid product substantially free of cobalt.

7. In a hydroformylation process wherein propylene is contacted in an initial reaction zone with carbon monoxide and hydrogen in the presence of a cobalt hydroformylation catalyst under hydroformylation conditions to product a crude hydroformylation product comprising butyraldehydes and butanols, which is subsequently decobalted and distilled, the improvement in said process of: separating said crude product into a gaseous and liquid product; passing said liquid product into a decobalting zone, said zone being maintained at a temperature of from about 60° to about 110° C., forming a mixture of an aqueous acetic acid solution having a concentration of from about 1 to about 10 percent by weight and said liquid product, in a volume ratio of liquid product to acetic acid solution of from about 8:1 to about 1:1, said acetic acid being added in an amount sufficient to combine with all the cobalt present in both the gaseous and liquid phase; simultaneously sparging said gaseous product into said mixture at a rate sufficient to cause vigorous agitation of said liquid product and acid solution; and removing overhead a gaseous and liquid product substantially free of cobalt.

References Cited in the file of this patent
UNITED STATES PATENTS

| | | |
|---|---|---|
| 2,679,534 | Koontz | May 25, 1954 |
| 2,686,206 | Cerveny | Aug. 10, 1954 |
| 2,744,936 | Mertzweiller | May 8, 1956 |
| 2,757,205 | Mertzweiller et al. | July 31, 1956 |
| 2,757,377 | Mertzweiller et al. | July 31, 1956 |
| 2,759,025 | Carter et al. | Aug. 14, 1956 |
| 2,816,933 | Mertzweiller | Dec. 17, 1957 |
| 3,007,973 | Weisemann | Nov. 7, 1961 |

OTHER REFERENCES

I. G. Farben Industries Aktiengesellschaft (Oxo Process), T.O.M. Reel 36, item 21 and part of item 36, page 7.